United States Patent [19]
Vaman et al.

[11] Patent Number: 6,011,780
[45] Date of Patent: Jan. 4, 2000

[54] TRANSPARANT NON-DISRUPTABLE ATM NETWORK

[75] Inventors: Dhadesugoor R. Vaman, Frederick, Md.; Tai Noh, Manalapan; Jay D. Bose, Short Hills, both of N.J.

[73] Assignee: Stevens Institute of Technology, Hoboken, N.J.

[21] Appl. No.: 08/862,631

[22] Filed: May 23, 1997

[51] Int. Cl.[7] .................................................. H04J 3/14
[52] U.S. Cl. ............................................ 370/237; 370/242
[58] Field of Search ..................................... 370/227, 228, 370/237, 231, 223, 224, 242, 244, 249, 222, 225; 455/440, 441; 340/825.01, 827

[56] References Cited

U.S. PATENT DOCUMENTS

| | | | |
|---|---|---|---|
| 4,829,554 | 5/1989 | Barnes et al. | 455/432 |
| 5,016,243 | 5/1991 | Fite, Jr. | 370/16 |
| 5,113,398 | 5/1992 | Howes | 371/11.2 |
| 5,140,695 | 8/1992 | Yasuda et al. | 455/441 |
| 5,146,452 | 9/1992 | Pekarske | 370/228 |
| 5,170,391 | 12/1992 | Arnold et al. . | |
| 5,235,599 | 8/1993 | Nishimura et al. | 371/11.2 |
| 5,239,537 | 8/1993 | Sakauchi | 370/16 |
| 5,239,667 | 8/1993 | Kanai | 455/441 |
| 5,241,534 | 8/1993 | Omuro et al. | 370/16 |
| 5,278,977 | 1/1994 | Spencer et al. | 395/575 |
| 5,301,184 | 4/1994 | Uriu et al. | 370/16 |
| 5,317,562 | 5/1994 | Nardin et al. | 370/16 |
| 5,333,130 | 7/1994 | Weissmann et al. | 370/16 |
| 5,396,253 | 3/1995 | Chia | 455/441 |
| 5,398,236 | 3/1995 | Hemmady et al. | 370/16 |
| 5,408,465 | 4/1995 | Gusella et al. | 370/17 |
| 5,412,376 | 5/1995 | Chujo et al. | 340/825.01 |
| 5,461,607 | 10/1995 | Miyagi et al. | 370/16 |
| 5,461,611 | 10/1995 | Drake, Jr. et al. | 370/54 |
| 5,473,598 | 12/1995 | Takatori et al. | 370/16 |
| 5,475,675 | 12/1995 | Kondo et al. | 370/16 |
| 5,488,606 | 1/1996 | Kakuma et al. | 370/16 |
| 5,490,138 | 2/1996 | Niestegge et al. | 370/56 |
| 5,495,472 | 2/1996 | Ohara | 370/16.1 |
| 5,521,910 | 5/1996 | Matthews | 370/54 |
| 5,559,959 | 9/1996 | Foglar | 395/183.19 |
| 5,590,118 | 12/1996 | Nederlof | 370/218 |
| 5,590,126 | 12/1996 | Mishra et al. . | |
| 5,600,630 | 2/1997 | Takano et al. | 370/218 |
| 5,621,721 | 4/1997 | Vatuone | 370/16 |
| 5,621,722 | 4/1997 | Edmaier et al. | 370/16 |
| 5,623,481 | 4/1997 | Russ et al. | 370/225 |
| 5,652,751 | 7/1997 | Sharony | 370/228 |
| 5,715,237 | 2/1998 | Akiyoshi | 370/228 |
| 5,717,796 | 2/1998 | Clendening | 370/222 |
| 5,768,527 | 6/1998 | Zhu et al. | 395/200.61 |
| 5,859,836 | 1/1999 | Eslambolchi . | |
| 5,875,185 | 2/1999 | Wang et al. . | |

*Primary Examiner*—Douglas W. Olms
*Assistant Examiner*—Kenneth Vanderpuye
*Attorney, Agent, or Firm*—Friscia & Nussbaum

[57] ABSTRACT

A method and apparatus for the transparent, non-disruptable transfer of data, particularly multimedia data, through any packet-based network, such as an ATM network is provided. The method of the present invention includes the step of setting a primary path and a secondary path between nodes of a network, or of a network domain. Accordingly, when a switch or node establishes a Virtual Path (VP) to another switch with specified effective bandwidth, it also has an alternate VP that is available, although no bandwidth is actually used. The method of the present invention further includes the step of optimizing the available capacity of the system through management actions. For handling congestion and resource failures, the total effective bandwidth on each physical link is categorized in terms of idle capacity (unused or available), used capacity (for existing VPs), and spare capacity. When a resource failure occurs, the idle capacity is used for real-time switching of the VP and service is not disrupted. This is accomplished by an alarm indication management cell which is delivered when a resource problem is encountered. This management cell sets forth the secondary path and the bandwidth associated therewith. On the other hand, if idle capacity does not exist, the spare capacity is used, while the bandwidth of all other VPs is reconfigured using virtual bandwidth optimization. Therefore, service disruption does not occur. In a wireless, mobile network, the present invention monitors node movement and takes management actions on the basis of such node movement to prevent service disruption.

55 Claims, 8 Drawing Sheets

MINIMUM DUAL PATH TOPOLOGY BETWEEN NODE Ni AND
NODE Nj I/O TO PREMISE NETWORK OR DESKTOP

Ni - ATM SWITCH + CROSS CONNECT
TE - TERMINAL ENTITY
     (MULTIMEDIA DESKTOP OR SERVER)
UNI - USER-TO-NETWORK INTERFACE
NNI - NETWORK-TO-NETWORK INTERFACE
PRIPATH - PRIMARY PATH
SECPATH - SECONDARY PATH

- PRIMARY PATH IS ALLOCATED RESOURCE FOR QoS
- SECONDARY PATHS ARE ESTABLISHED WITH NO ALLOCATION OF RESOURCE

TRANSPARANT NON-DISRUPTABLE ATM NETWORK

BACKGROUND OF THE INVENTION

1. Field of the Invention

The present invention generally relates to a transparant non-disruptable Asynchronous Transfer Mode (ATM) network, and more specifically to a method for making real time intelligent decisions for handling non-availability of links and nodes in a packet-based network without disrupting associated end-users.

2. Related Art

Non-availability of links and nodes (hereafter called resources) in a packet-based network such as an ATM network can occur due to several reasons including resource congestion, resource failure and mobility of the resource. The non-availability of resources is a particularly acute problem when dealing with multimedia.

Multimedia service provisioning requires two important aspects to be addressed: end-to-end Quality of Service (QoS), and seamless transport of information across heterogeneous networks. Traffic characteristics of multimedia services vary dynamically and maintaining QoS assurance with a high probability is extremely critical for global service provisioning. It is also important to recognize that end-user information must be delivered across multiple heterogeneous networks, often with different ownerships. The third important issue is multi-casting capabilities of the network.

Transporting multimedia services offers specific challenges for the networked environment because the very nature of multimedia does not allow for gaps in the content provided, i.e. neither lost or missing packets, nor transmission gaps are acceptable by the end users. Successful delivery of multimedia content requires user defined end-to-end QoS. However, QoS is impacted by network behavior of both the local and remote Local Area Networks (LANs) and ATM Wide Area Networks (WANs). Additionally, the multi-casting requirement adds complexity. A global network must provide the infrastructure that delivers end-to-end QoS with multi-casting by taking real-time "local" actions in different parts of the network to curb any abnormal behavior. These actions must be transparent to the end-user.

From a user perspective QoS for multimedia services can be specified in terms of bandwidth, delay, and error rates. Bandwidth is fixed for certain types of applications and varies with time in some others. Delay requirements are specified for each application based on user-to-user interaction with a typical value and an upper bound. Acceptable number of errors are specified probabilistically. Network service provisioning requires that these QoS values be allocated for the local premise network, WAN, and the remote premise network. Once allocated, each network segment must guarantee the QoS with a high probability of assurance under normal network conditions. Local network segments can usually guarantee QoS with a high probability of assurance since control and service provisioning for such segments are more homogenous. That is not the case for WANs since it is accessed by several heterogeneous local segments.

Resource failures are common in operational networks. These are typically handled in telephone networks by disconnecting the calls passing through a failed area; and in data networks by pausing the data transfers until alternate paths are found. These mechanisms increase the delay in service provisioning and thereby impact the QoS parameters. Multimedia service provisioning with multi-casting requires the handling of failures in a localized fashion. The self-healing architecture must provide real-time solutions that helps maintain QoS within specified limits even under adverse conditions, and with end-user transparency.

Physical link failures have been handled in fiber-based networks (e.g. FDDI networks) by enabling real-time loop back at the interface where the failure has occurred. In FDDI networks, two unidirectional rings are combined into one ring for continued information transport. Similarly, if there is a node failure, the rings can be combined into one. This is an adequate solution when information is transported asynchronously based on packets for data services, where the traffic at the input to the network does not dynamically vary. The case of multimedia services mandates managing varying bandwidth demands dynamically.

FDDI is a LAN backbone technology that has a fall back interface built-in-either through a dual ring or through dual homing of concentrators. Tolerance to single failures is a system design feature. Dual counter-rotating rings wrap around in the event of failure to provide reliable connectivity. It takes a second failure (if the first one is not fixed), to segment the ring. Dual attached trees of concentrators can support a large number of single-attach end stations with an increased level of reliability. However, FDDI requires that stations and concentrators on the backbone work properly. If optical bypass switches are not used, one station down is all that the system can tolerate. In the event of recoverable failures, end-system applications do not need to take any explicit connection establishment action since it is a packet switched network. If there is a failure, the network effectively becomes one ring and the usable bandwidth is cut in half.

Another way of handling network resource problems during the delivery of multimedia is to rely on the server to provide continuous data by running multiple copies of the transmission and by retransmittting one or more copies if a resource problem develops. This can lead to the unsynchronized transmission of numerous copies of the data by the server. Accordingly, this is a very cumbersome and expensive solution.

Avoiding disproportionate loss of service from a single point of failure is a serious challenge in ATM networks. In most current implementations, a cut or breakage in a virtual circuit or path requires the end station to establish another path.

Previous efforts at providing self-healing networks and/or networks having the ability to take alternate paths because of resource problems have not been successful in providing solutions to all of the problems associated with multimedia transmissions. These previous efforts include the following:

Vatunone, U.S. Pat. No. 5,621,721, discloses a communication network with a database consistency mechanism. A sequence number and a set of routing information for each of a set of virtual circuits in the communication network are maintained in the main database and an auxiliary database in each set of communication nodes in the communication network. A new sequence number is assigned to a virtual circuit each time the virtual circuit is routed. The sequence of numbers in the main database or the auxiliary database in each of the communication nodes are internally and externally verified if one of the communication nodes switches between the main database and the auxiliary database. Virtual circuits are rerouted through the communication network when necessary.

Russ, et al., U.S. Pat. No. 5,623,481, discloses a system for verification of an alternate route found subsequent to a restored process based on the self healing network restoration of a telecommunications network due to failure or disruption in the network. To determine whether a link has been restored by means of an alternate route, a path verification method and system is utilized to provide a continuity check. The Operations Support System of the network retrieves messages from the end nodes and compares the previous stored path verification message for each of the end nodes, to determine whether the communications path is continuous and valid.

Takano, et al., U.S. Pat. No. 5,600,630, discloses an ATM path changing system and method for use which can set an alternating route in the event of a failure occurring in a transmission line or in a virtual path. This is accomplished by providing a header converter, a plurality of routing tables, a register to set failure internal routing information, a comparator for comparing the contents of the register with the internal routing information of a system, and a selector for selecting the contents of one of the first and second routing tables.

Nederlof, U.S. Pat. No. 5,590,118, discloses a method for rerouting a data stream comprising the steps of detecting a failure between switching nodes, transmitting from one switching node a request with first and second address fields of the first and second switching nodes, and each switching node retransmitting the signal until an alternative route for the data stream is found.

Foglar, U.S. Pat. No. 5,559,959, discloses a method for transmitting message cells via redundant virtual path pairs of an ATM communication network. Each cell has an internal cell header for each of the paths of a path pair. The network has a plurality of multi-stage switching networks, whereby the message cells can be transmitted via a virtual path pair duplicated by a switching network at the beginning of the respective pair path. Based on the header parts, the associate cell message is forwarded or is duplicated and then forwarded now resulting in two message cells.

Matthews, U.S. Pat. No. 5,521,910, discloses a method for determining a best path from a source node to a destination node. The method includes a first recursive search in parallel which is initiated at the source node and proceeds outwardly to discover neighboring nodes and calculates traversal paths until reaching the destination node.

Ohara, U.S. Pat. No. 5,495,472, discloses a method and apparatus for allowing cross connections to be set up in network elements for automatic healing of a signal path by rerouting the signal on a failed working path to a protection path.

Niestegge, et al., U.S. Pat. No. 5,490,138, discloses an ATM communication system comprising a plurality of concentrator equipment units connected to an ATM communication equipment unit in a ring line system. Each of the concentrator equipment units is connected via a separate virtual path to the corresponding ATM equipment unit and to the remaining concentrator unit, to form a plurality of virtual connections.

Kakuma et al., U.S. Pat. No. 5,488,606 discloses a procedure for switching-over systems for use in a duplexed ATM exchange operating in its asynchronous transfer mode. An ATM exchange is electronic hardware for repeating and exchanging the cells in an ATM network. The ATM exchange has an internal switching unit to process the routing of the cells. The hardware of the internal switching unit processes the routing control by referring to the tag attached to the head end of each ATM cell. Since ATM exchanges are often configured as an active (master) system and a parallel backup (slave) system, a cell transmission timing difference arises between the two systems. Sometimes, during the operation of the exchange, this cell transmission timing difference causes the loss of a cell or the needless duplication of a cell. Rather than synchronize the master and slave systems and destroy the merit of the ATM network, it is preferable to duplex the exchange's switching units to improve reliability. The procedure for switching-over the parallel systems involves assigning a master or slave system indicating mark to each cell upon detection and transmitting the cells to a respective output highway based on the mark. Cells having a mark designating the master system are stored after detecting at least one cell having a mark which corresponds to a system switch-over.

Kondo et al., U.S. Pat. No. 5,475,675 discloses an apparatus and method for non-stop switching in which a transmission line for transmitting statistically multiplexed cells which can be switched from a current transmission line to a spare transmission line without causing momentary interruption. The apparatus comprises a current statistical multiplexer for producing a first sequence of information cells along a first transmission line and a spare statistical multiplexer for producing a second or re-channeled sequence of information cells along a second transmission line. The apparatus also includes a means for detecting empty information cells in the first and second sequences and a means for using the detected empty cells as a trigger to measure the phase shift between channels. Once the phase shift is determined, the information cells subsequent to the first sequence are re-routed to the second transmission line in accordance with the timing requirements of the new path. In this way, no cells or parts of cells are lost or needlessly duplicated.

Takatori et al., U.S. Pat. No. 5,473,598 discloses a cell routing method and apparatus comprising two or more pathway routing tables formed in accordance with data received from address filters of an ATM switch to store routing information for indicating the destination of a cell output. Also provided are a plurality of conversion tables formed from the data provided by Virtual Path Identifier conversion circuits. An input interface circuit determines which routing table to pair with which conversion table. This information is passed to a switch circuit which effects the re-routing. This reference does not discuss optimizing bandwidth.

Miyagi et al., U.S. Pat. No. 5,461,607 discloses an ATM communication apparatus and a failure detection and notification circuit comprising an ATM exchange, a plurality of transmission lines and a management section at the line/connection end point for each transmission line. The management section outputs a channel failure signal upon detection of a connection failure. The channel failure signal is transmitted to a failure detection and notification circuit through a signal line separate from the transmission line for transmitting the information cells. An Alarm Indication Signal (AIS) generation circuit extracts the AIS cell, determines the correct failure state, generates a far-end-receive-failure cell which corresponds to the failure state and inserts the far-end-receive-cell into the stream of the information cells. There is discussion of how re-routing is done, how pathways are created, and how bandwidth is utilized.

Chujo et al., U.S. Pat. No. 5,412,376 discloses a method for structuring an ATM network in which information cells are transferred between a pair of nodes that are connected by a working route and a plurality of alternate routes that include intermediate nodes. When a failure occurs in the working route, the second node detects the failure and transmits an alarm to the first node. The first node, upon receipt of a the alarm, transmits a switching command cell to switch the first Virtual Path Indicator (VPI) conversion table to the second VPI conversion table. The second VPI conversion table is programmed in advance to correspond to every failure pattern, and converts the path of the input cell in accordance with the data stored within the switched second VPI conversion table and sets up an alternate virtual path by which the information cells may be transmitted. Does not discuss the utilization of bandwidth.

Hemmandy et al., U.S. Pat. No. 5,398,236 discloses an inter-node communications link failure recovery system for ATM nodes in which connections are quickly switched from a faulty link to one or more existing links. The Network Management System, which includes a CPU, controls the overall operation of the system via program commands to the nodes. When a fault detector at each node detects a failure in a link between a pair of nodes, an alarm signal is sent to the Network Management System. Within a node, alternate connection routes are predetermined using header translator tables for every connection origination at or terminating to a circuit connected to a link of interest. Because each interface card has a incoming header translator table and an outgoing header translator table, an ATM switch may serve to route incoming cells to an outgoing link in accordance with the routing information contained in the cell header.

Weissmann et al., U.S. Pat. No. 5,333,130 discloses a drop and insert multiplexer network that is self healing in case of a break or failure. The network comprises two end stations, known as field nodes, connected by two lines and a chain of intermediate time divisible multiplexer stations. Also a central node is provided. In the case of a failure within the network, the field node which detected the failure receive a message from the central node. Upon receiving the message, the field nodes and the interconnecting links do not form a new connection at the aggregate level but instead the channel interfaces change the direction of the connection as necessary to recover the full operation of the network.

Nardin et al., U.S. Pat. No. 5,317,562 discloses a method and apparatus for initially routing and rerouting a multiplicity of connections to a slave node based upon a search which determines and selects the best route with regard to available bandwidth, loading considerations and maximum allowable delays.

Uriu et al., U.S. Pat. No. 5,301,184 discloses a control system for switching between the active system and the standby system of a duplicated structure in an ATM exchange. The structure of the switch units are identical and each contains its own self routing module. Each self routing module has the switching function of directing each ATM cell to one of a plurality of outputs depending upon the route indication information that is defined for each of the switching stages.

Spencer et al., U.S. Pat. No. 5,278,977 discloses a distributed, multi-node system for communicating financial transactions between a plurality of distributed and dispersed point of service terminals and one or more central computers. Inherent testing and correction delays are overcome by providing means for initiating and running loop tests. The system analyzes the loop test to see if there is in fact a failure. Should a failure be detected, the system reconfigures itself based on pre-programmed information to work around the failure.

Omuro et al., U.S. Pat. No. 5,241,534 discloses a change-back system for a multi node ATM network in which a rerouting path is set to replace an original path when a fault is generated in the original path with the network. The change-back system uses three separate and task dedicated circuits to respectively detect a fault, reroute the virtual path, and change the path from the rerouting path to the original path after the fault has been corrected. To effect a rerouting without losing cells, the cell reception times of all cells are recorded within the header of the cell. Using this information, the third circuit calculates "guard time." The guard time is the difference between the first and second reception times and is used to delay the transmission of a cell from the alternate path to the original path.

Sakauchi, U.S. Pat. No. 5,239,537 discloses a broadband integrated services digital network system comprising a plurality of switching nodes that are interconnected by transmission lines having communication links and service links. Each switching node comprises an ATM self-routing network for routing cells from the inputs and outputs of network transmission links according to a virtual path identifier contained in the cells. A virtual path memory is provided for storing data indicating link-to-link connections associated with normal virtual paths and data indicating link-to-link connections associated with alternate virtual paths.

Nishimura et al., U.S. Pat. No. 5,235,599 discloses a self healing network with distributed failure restoration capability. This network comprises a first and second node and a plurality of intermediate nodes therebetween. In response to a failure in a channel or transmission line which terminates at the first node, the first node transmits as many specialized control packets as there are adjacent transmission lines. Once received, the third nodes broadcast copies of the received control packet to each adjacent node. Shortly thereafter, the second node transmits a specialized return packet to a given third node. In response, the given third node determines whether there is a spare channel or transmission line to an adjacent node located on a route leading to the first node. If such an adjacent node is found, the third node transmits a positive acknowledgment and transmits the received return packet to the adjacent node. Upon receiving this packet, the adjacent node becomes part of the alternate virtual path by which the information is rerouted around the failure.

Howes, U.S. Pat. No. 5,113,398 discloses a self-healing data network and network node controller. Data transmission of data cells form a message permitting, self-clocking operation of each node. Elastic buffering is implemented to allow receipt of messages without regard to the timing considerations of the phase that is created by the asynchronous operation of each node relative to other nodes. The nodes of this network are able to independently detect faults regardless of the operating status of the other, surrounding nodes.

Fite, Jr., U.S. Pat. No. 5,016,243 discloses an arrangement of transmission facilities forming virtual circuits for transmitting packets of information in a network. Faults are detected in transmission paths associated with a network node and an individual fault indication message is generated for each network facility that has at least one virtual circuit affected by the fault. To effect automatic fault recovery, any node receiving a fault indication message determines which virtual circuits identified in the message are terminated in the node and which virtual paths pass through the node. The virtual circuits which are terminated in the node are switched to alternate virtual circuits.

None of these previous efforts, taken either alone or in combination, teach or suggest all of the elements of the present invention. Particularly, none of the previous efforts take preventative action by optimizing bandwidth, establishing primary and secondary paths and monitoring the connections through management actions to prevent resource failure from disrupting data transmission. Rather, these previous efforts react to resource failures by taking remedial actions after data transmission has been disrupted by resource failures.

OBJECTS AND SUMMARY OF THE INVENTION

It is a primary object of the present invention to provide a method for the non-disruptable transfer of data, particularly multimedia data, through an ATM or other packet-based network.

It is an additional object of the present invention to provide a method for the non-disruptable transfer of data, particularly multimedia data, through an ATM or other packet-based network, which re-routes data around network resource problems, which re-routing is transparent to users.

It is even an additional object of the present invention to provide a method for the transparent, non-disruptable transfer of multimedia data through ATM network, which method can be used in a wired or a wireless network.

It is still an additional object of the present invention to provide a method for setting a primary path and a secondary path between nodes in an ATM network.

It is yet an additional object of the present invention to provide a method for switching from a primary path to a secondary path between nodes in an ATM network because of resource problems without disrupting end users.

It is another object of the present invention to provide integrated network management service which monitors an ATM network.

It is even another object of the present invention to provide a method for virtual path optimization to increase available capacity in an ATM network.

It is yet another object of the present invention to provide an alarm indication service (AIS) for an ATM network which is located in a management cell for notifying other nodes when a primary path has been interrupted.

It is still yet another object of the present invention to provide an alarm indication management cell which is delivered when a primary path has been interrupted and which indicates the secondary path and sets forth the bandwidth available along the secondary path.

It is an additional object of the present invention to provide primary and secondary paths between nodes in an ATM network, and which does not require re-establishment of a path to shift from the primary path to the secondary path.

It is even an additional object of the present invention to use existing nodes or switches in connection with the method of the present invention by implementing the present invention through software and add-on covers for existing switches.

It is still even an additional object of the present invention to provide a node or switch which can handle the management actions required to implement the method of the present invention.

It is yet even an additional object of the present invention to provide a method for transparant, non-disruptable service through an ATM network which can be used with existing node technology, and which can be used enhanced nodes for increased efficiency.

It is a further object of the present invention to provide a method for the transparent, non-disruptable transfer of data through an ATM network which can be used in a wireless network and which may include a mobile base station.

It is even a further object of the present invention to provide a method for identifying movement of nodes in a wireless network based on power, power history, velocity, and acceleration of the nodes.

It is still even a further object of the present invention to provide a survivable, connected network in a hostile environment such as on a battle field or in other military and/or tactical environments.

These and other objects are achieved by the present invention which provides a method and apparatus for the transparent, non-disruptable transfer of data, particularly multimedia data, through any packet-based network, such as an ATM network. The method of the present invention includes the step of setting a primary path and a secondary path between nodes of a network, or of a network domain. Accordingly, when a switch or node establishes a Virtual Path (VP) to another switch with specified effective bandwidth, it also has an alternate VP that is available, although no bandwidth is actually used. The method of the present invention further comprises the step of optimizing the available capacity of the system through management actions. For handling congestion and resource failures, the total effective bandwidth on each physical link is categorized in terms of idle capacity (unused or available), used capacity (for existing VPs), and spare capacity. When a resource failure occurs, the idle capacity is used for real-time switching of the VP and service is not disrupted. This is accomplished by an alarm indication management cell which is delivered when a resource problem is encountered. This management cell sets forth the secondary path and the bandwidth associated therewith. On the other hand, if idle capacity does not exist, the spare capacity is used, while the bandwidth of all other VPs is reconfigured using virtual bandwidth optimization. Therefore, service disruption does not occur. In a wireless, mobile network, the present invention monitors node movement and takes management actions on the basis of such node movement to prevent service disruption.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1:
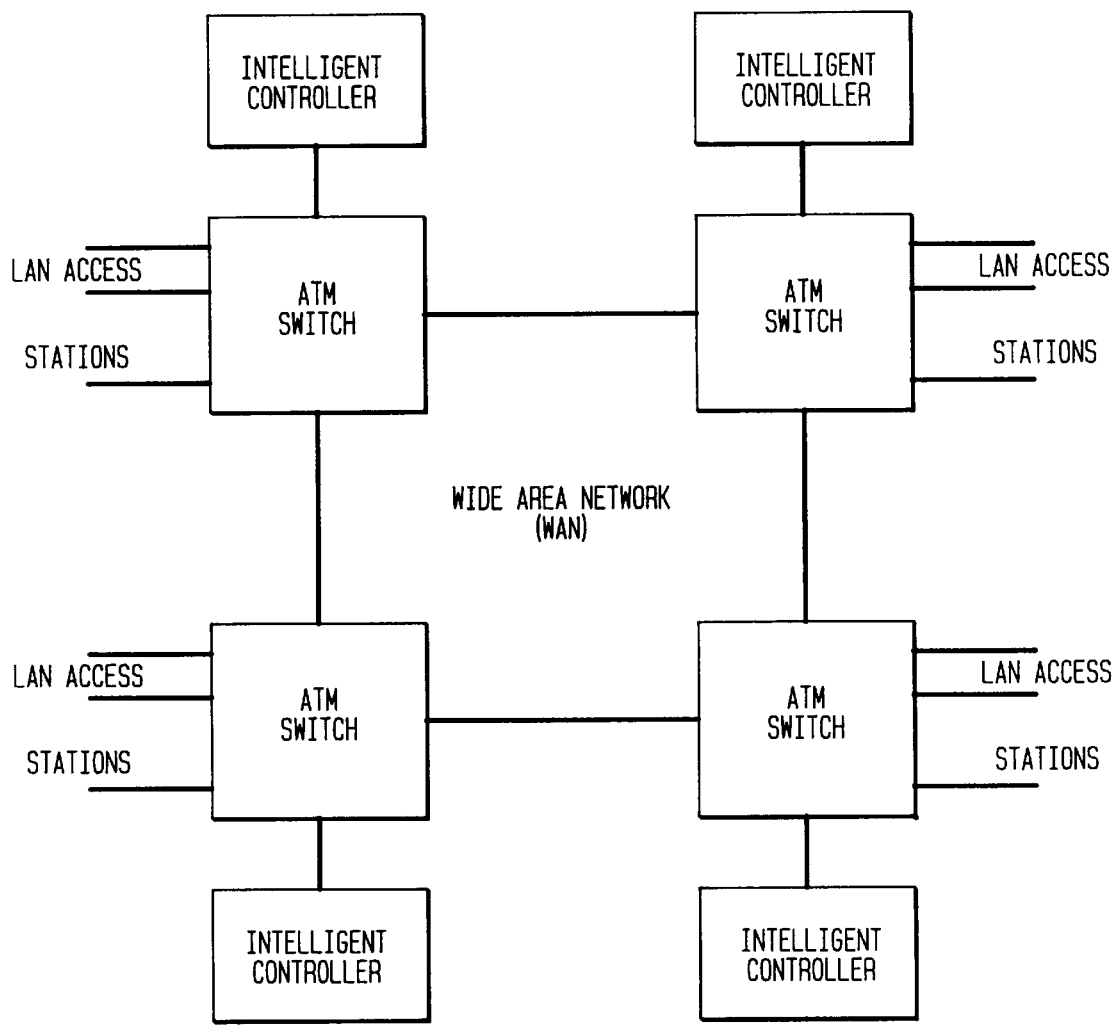
FIG. 1 is a schematic depiction of an ATM WAN network.

The present invention is directed to a method for providing a transparent non-disruptable ATM network. The present invention has direct applicability for providing commercial switched ATM Wide Area Network (WAN) multimedia services that require Quality of Service (QoS) guarantees with high probability in both fixed line and wireless situations.

There are a number of components involved in the method of the present invention including: 1. Virtual Path Optimization which has the purpose of increasing the available capacity in the system, and which operates in the background of the network; 2. Alarm Indication Service which comprises a management cell delivered when there is a resource failure, the management cell containing instructions to follow a secondary path and providing the amount of bandwidth available over the secondary path; and 3. The setting of primary and secondary paths between nodes in the network so that communication does not need to be re-established when a network failure occurs and a switch from a primary path to secondary path is made.

The present invention makes intelligent decisions for finding alternate virtual paths for existing ATM Switched Virtual Connections (SVC) or Permanent Virtual Connections (PVC) in the event there is a resource failure or congestion in any part of the network. The present invention takes preventive actions when a failure occurs, i.e. a path that is unaffected by network resource problems is determined prior to a packet being sent. A management action identifies the abnormality and switches to alternate paths to continue to provide service to the end user. Off the shelf commercial switches can be used and the invention can be implemented by software and add-on hardware, or new switches can be fabricated.

The method of the present invention utilizes an algorithm, herein referred to as the Distributed Self-Healing and Dynamic Reconfiguration (DSDR) algorithm, a copy of which is attached hereto in Appendix A. The DSDR algorithm can reside in an ATM node or switch which may be fixed or mobile. The switch can be an access node (edge switch) or an intermediate switch (core switch) and serves to originate a connection and/or to pass transient traffic, respectively. This algorithm creates dynamic logical domain architectures based on topology optimization, with reconfiguration and local restoration of virtual paths (VP). Through management actions, each switch running the DSDR algorithm detects failures, congestion and mobility of the other switches to which it is connected. Based on the information received, the DSDR algorithm takes real time management actions to correct any irregularities that may be detected based on pre-set threshold values of acceptable levels of service and channel quality. The DSDR algorithm enhances existing switch architectures to provide multimedia and high service quality even with failed, congested or mobile resources. The algorithm is for a WAN implementation in a switched environment with partial mesh network to support alternate paths. Inherently it can provide bandwidth on demand during normal and faulty conditions if additional resources are available on the alternate route, and priority based services under fault circumstances when all of the resources are available on the alternate path.

The present invention is based on an integrated solution that includes: dynamic topology reconfiguration; call setup to include alternate paths; management actions; lossless recovery of cells at the remote node with minimal overhead and no retransmission; and background optimization of virtual path bandwidth.

Figure 2:
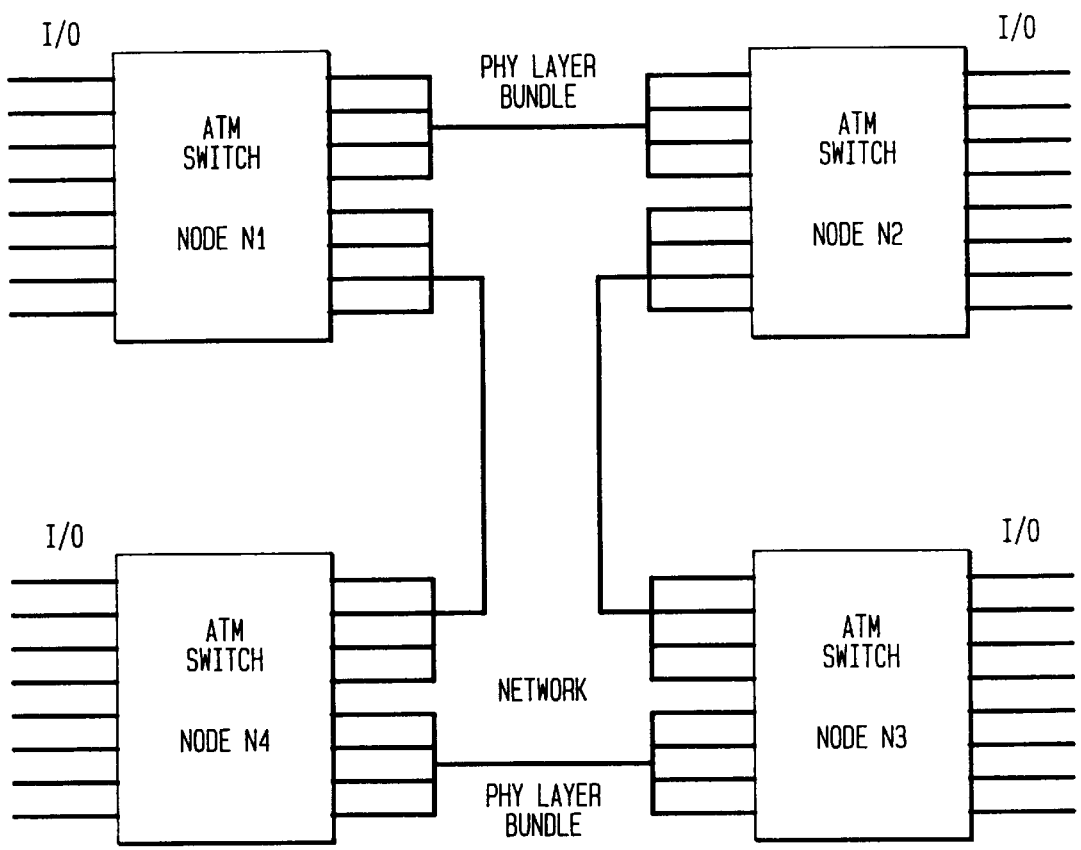
FIG. 2 is a schematic of the domain topology for an ATM WAN.

The ATM WAN topology is logically configured in interconnected domains. A domain is a set of nodes associated with a small area. Within the domain, the physical topology can be either a mesh topology or a ring topology or a tree topology. See FIGS. 1 and 2. Logically, from each node or switch there must be the potential to set up a VP to any other node inside the domain with at least two physical paths. That is, the node must be able to have a dual alternate path set for establishing a logical connection within the domain. This increases the survivability of service provisioning when resource failures occur.

Topology reconfiguration is crucial for handling congestion and resource failures. It is also essential for handling mobility of switches in a wireless ATM network. The DSDR algorithm is a topology reconfiguration algorithm based on virtual paths.

Figure 3:
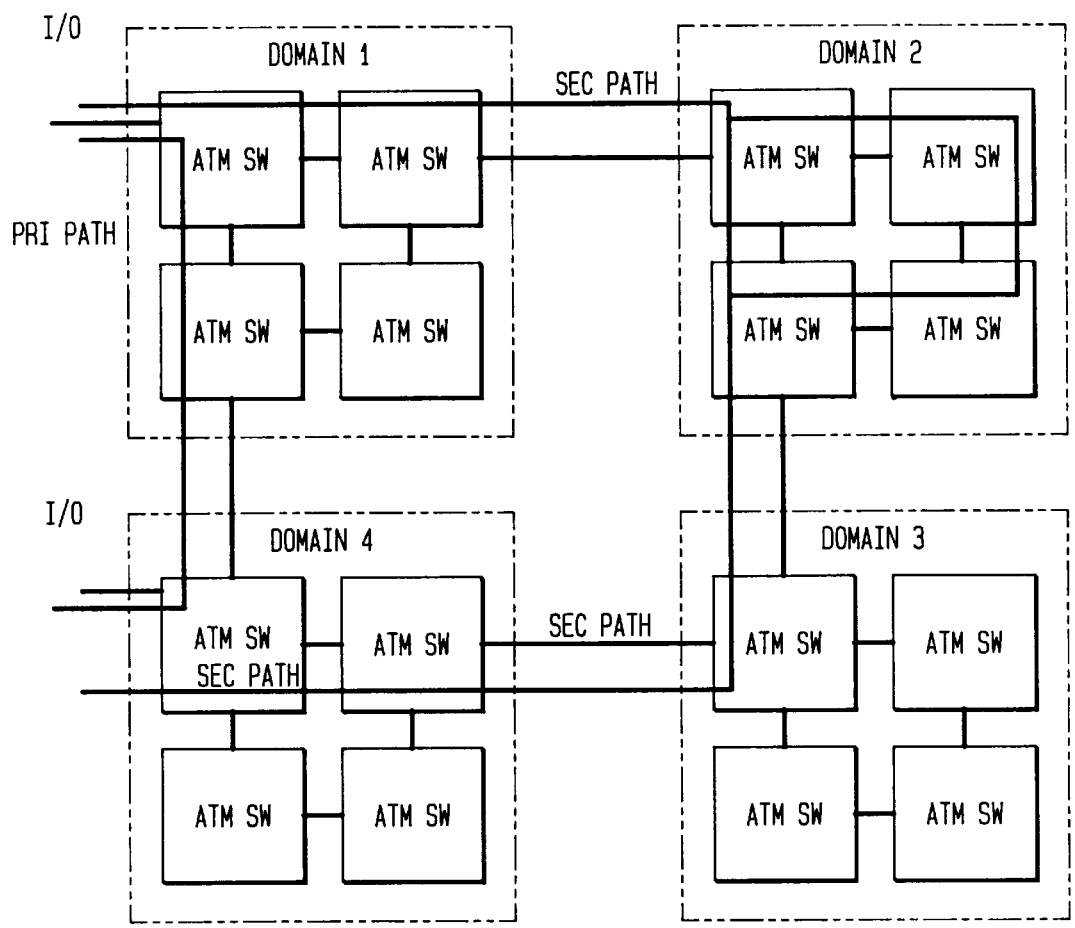
FIG. 3 is a schematic of the multiple paths in a multi-domain ATM network.

As shown in FIG. 3, when an ATM connection is made between switch pairs, there is a primary path (pripath) and a secondary path (secpath) established between the switch pairs. The primary path has the necessary bandwidth reserved for the connection. The secondary path does not reserve any bandwidth but serves as a logical assignment.

When service provision is between two nodes in different domains, the inter-domain topology also requires minimal dual VP connectivity. This ensures the existence of primary and secondary paths via different intermediate domains. When a particular domain through which a primary path is established either experiences congestion or has a resource failure, then service provisioning is switched to the domain that provides the secondary path. Management actions are needed to ensure identification of the congestion, or resource failure and for bandwidth reservation on the secondary path.

The method of topology reconfiguration takes place at the Virtual Path level using the concept of "minimal dual VP connectivity and spare virtual bandwidth." Topology reconfiguration is crucial for handling congestion and resource failures. It is also essential for handling mobility of switches in a wireless ATM network. The DSDR algorithm also includes a background VP bandwidth reconfiguration scheme that recursively computes the VP bandwidth and call blocking probability for each switch pair and class of service. It then finds an optimum BW reconfiguration of VPs that minimizes the worst case blocking for any switch pair. The DSDR algorithm assigns new values of VP bandwidth as long as the desired QoS is maintained for all service classes.

The DSDR algorithm is a multi-step process that will be described hereinafter. It begins with a call set up between domains that ensures an alternate path is assigned. Management actions detect failures and take the necessary Q.2931 based signaling actions, and the background virtual path reconfiguration algorithm optimizes the bandwidth along various links such that there is always a high probability of having bandwidth available on the alternate paths through the concept of spare bandwidth.

Figure 4:
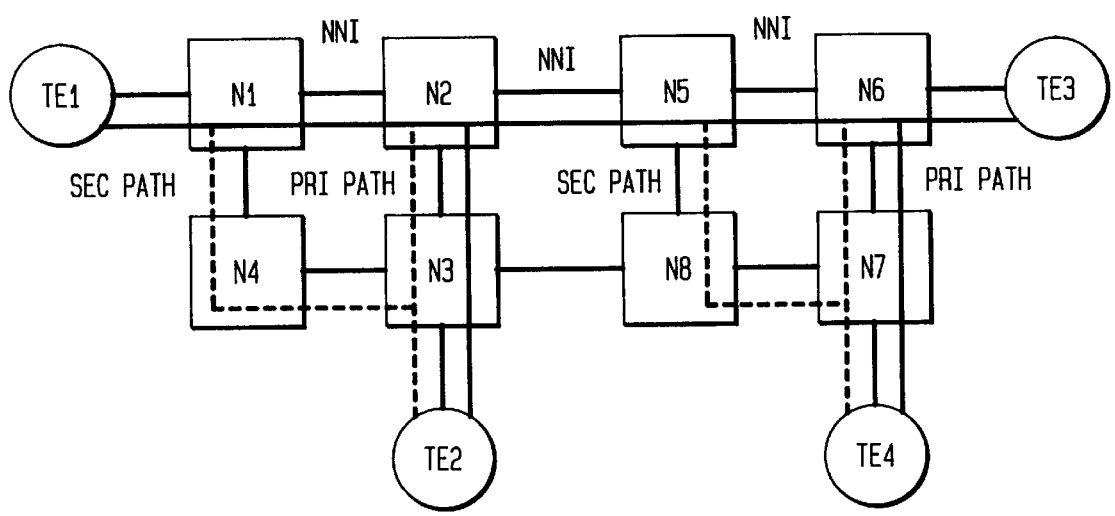
FIG. 4 is a schematic diagram of a point to multi-point connection using Q.2931.
Figure 4:
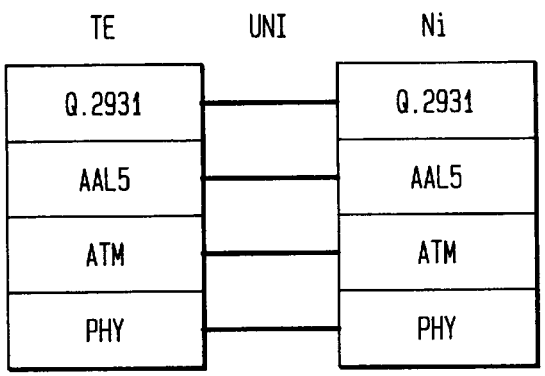

As shown in FIG. 4, in an ATM environment, the VP connection is established by using Q.2931 procedures that also supports multi-casting. When Q.2931 messages are received for connections, each node develops alternate virtual paths to the destination node within the domain. The primary path is assigned for service provisioning with the necessary bandwidth reserved for the service. The secondary path has VP labels and does not have any bandwidth reservation. All other call setup functions use existing UNI and NNI signaling methods.

Management actions are needed to handle congestion and resource failures. Congestion can occur in the ATM networks due to the variability in instantaneous bandwidths assigned to certain types of multimedia services. Typically, Variable Bit Rate (VBR) services are provided assurances of QoS based on average bandwidth requirements. Therefore, when these services require greater than average bandwidth simultaneously, congestion can occur. Resource failures can occur in networks due to hardware failures (link or node) or software failures.

From the point of view of information transport, congestion is observed at the upstream node (source node within a domain). Resource failures are observed by the down-stream node (destination node within a domain), due to failure of receiving ATM cells of a given service. In the case of congestion, the source node needs to take management actions to let the down-stream node know that it is going to switch to an alternate VP. In the case of resource failures, the down-stream node takes management actions to let the up-stream node to switch to an alternate VP for service.

Figure 5:
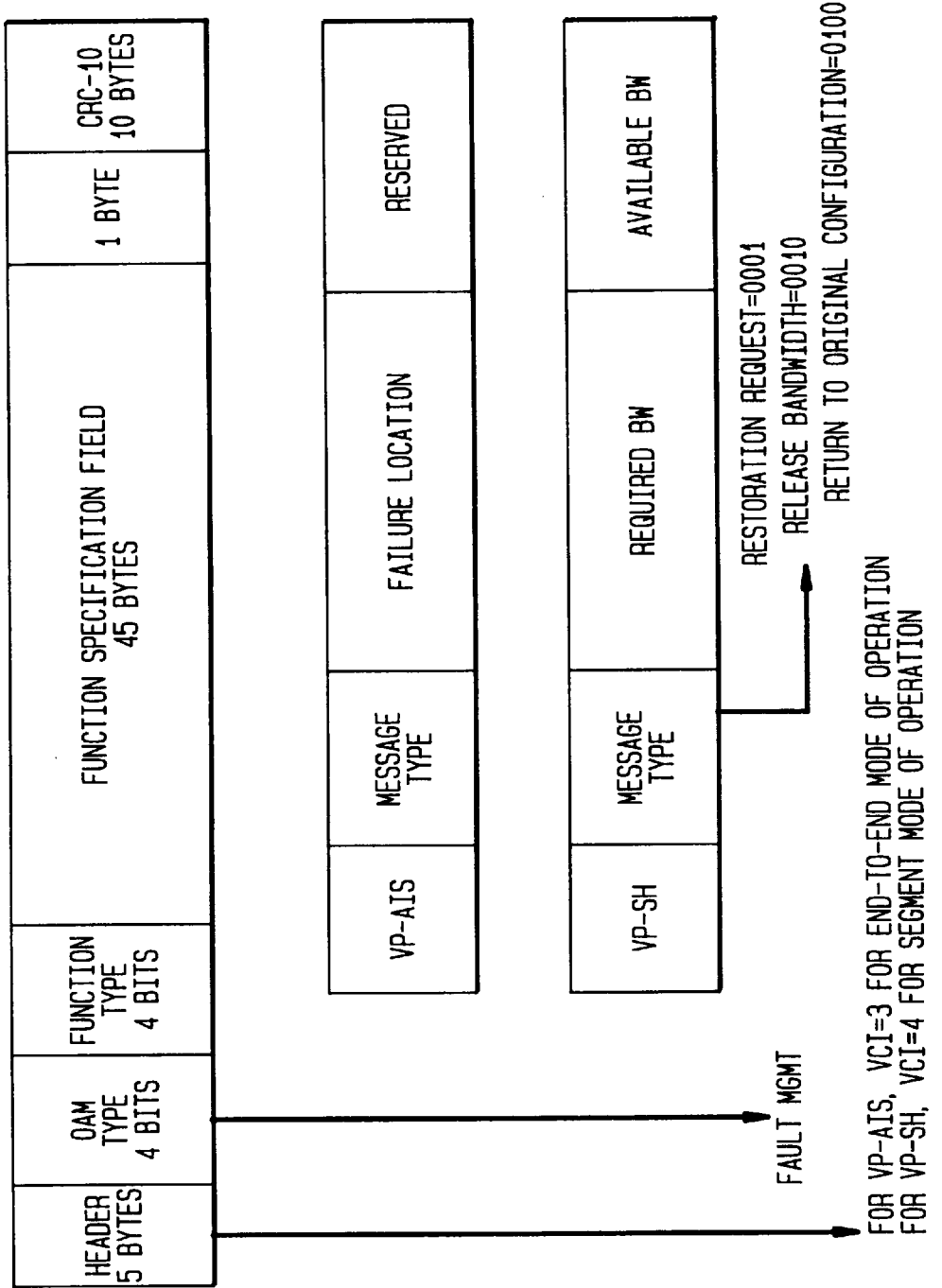
FIG. 5 is a schematic diagram of a fault management cell for management actions.

A set of management actions has been developed using the standard ATM alarm indication cell as shown in FIG. 5. In this method, the unused bits of the function type can be used for VP Self-Healing (VP-SF) identifier. The remaining portion of the cell consists of message type (specifies restoration request, release bandwidth and return to original configuration), required bandwidth and available bandwidth.

Figure 6:
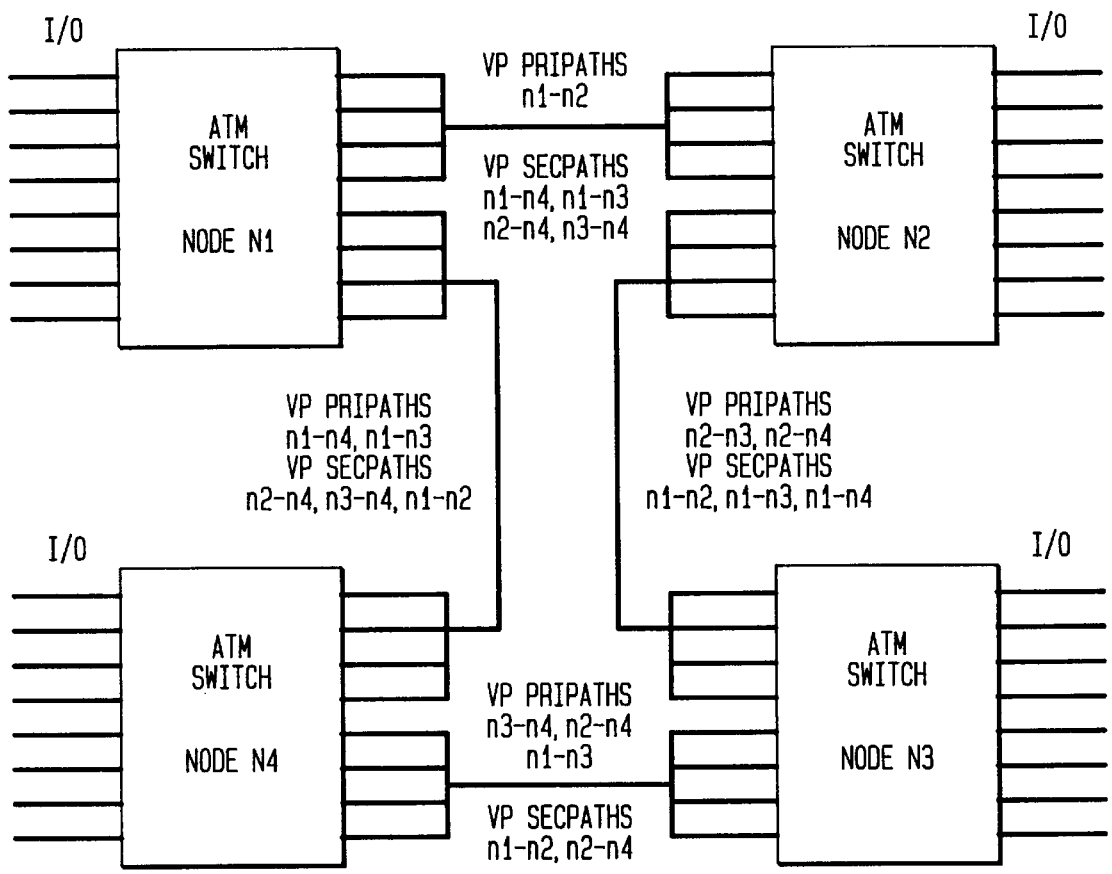
FIG. 6 is a schematic diagram of primary and secondary VPs in an ATM network.

For illustrative purposes, the topology in FIG. 6 is considered. There are four nodes (N1–N4) and for a specific service where N1 is receiving the incoming cells and delivering it to Node 3 for further transmission.

Assume that signaling procedure has established the primary path from Node N1 to Node N3 via node N4 (N1-N4-N3). The secondary path is N1-N2-N3. Node N1 collects cells and delivers to node N4 using VP14 and node N4 delivers these cells to Node N3 using VP43. This now defines the primary path being used.

Figure 7:
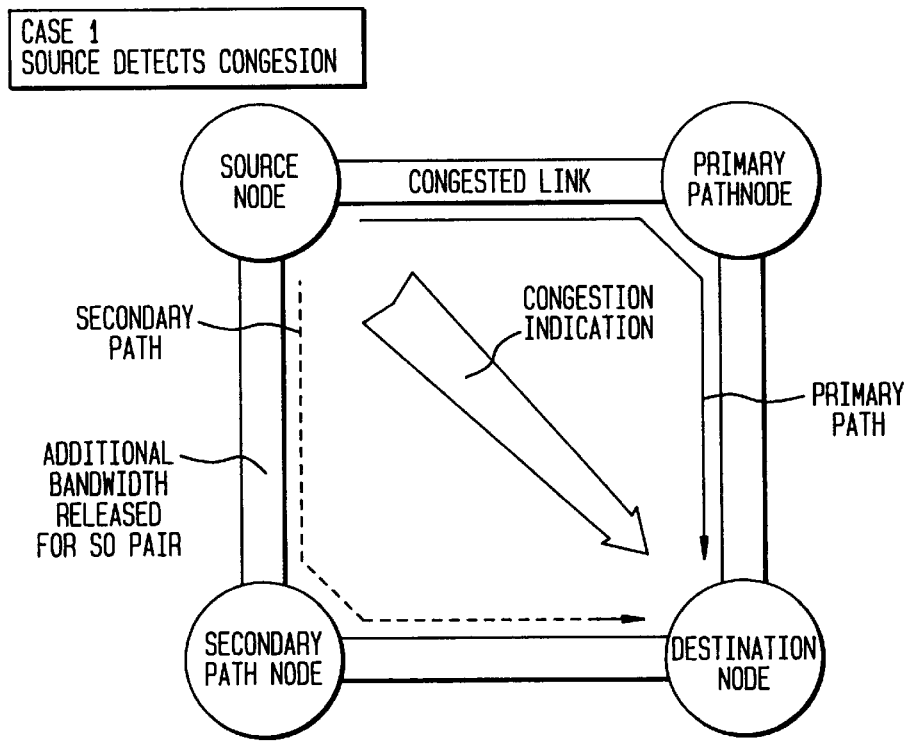
FIG. 7 is a schematic diagram of the management actions taken to handle congestion in an ATM network.

Referring now to FIG. 7, when congestion is noticed, Node N1 initiates management action to use the secondary path to deliver faster to node N3. The steps for management actions are:

Node N1 sends VP self-healing cell to Node N2 with the following contents:
Function type: VP-SH
Message Type: Release bandwidth request
Required Bandwidth: Fields include VP identifier and bandwidth unit value (quantized to prefixed values)—10 bytes for VP identifier and 10 bytes for bandwidth unit. That is, for each Vp identifier, there is a bandwidth unit. In this example, only one VP is being considered. Specify the VP identifier and unit bandwidth required.
Available bandwidth: had 20 bytes with 10 used for VP identifier and 10 used for bandwidth unit specification. This field is not used.

Node N2 sends a modified self-healing cell to Node N3 if it has less than the bandwidth requested by the Node N1. The new bandwidth value is entered for VP23. Note that there is a VP translation that occurs in Node 2 from VP 12 and VP23.

Node 3 receives the cell, and based on its availability on the outgoing paths, it specifies a value in units in the "available bandwidth field" for a specific incoming VP (VP23) of a self-healing cell to Node N2.

Node N2 modifies this cell and delivers unit bandwidth value that is minimum of VP 12 and VP23 and specifies the units in VP 12 field of the available bandwidth field.

Thus, the alternate path can be used for sending additional cells to handle congestion resolution. Once the congestion is removed, Node N1 may initiate a management action to return to the original configuration by setting the message type.

Figure 8:
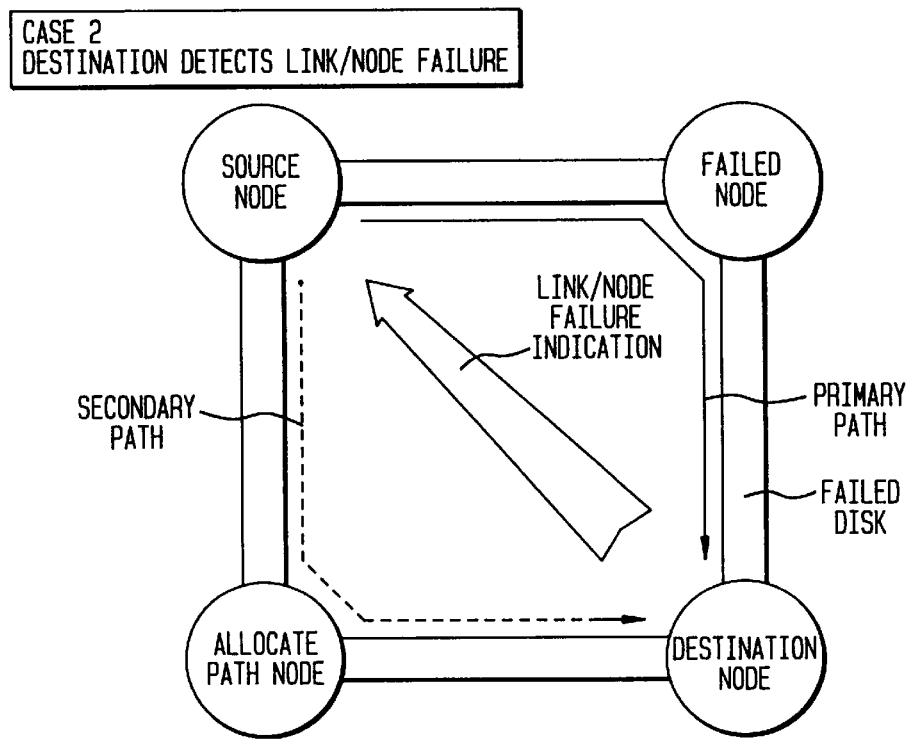
FIG. 8 is a schematic diagram for management actions taken in an ATM network for resource failures.

Referring now to FIG. 8, resource failure can be either a node failure or a link failure. When it occurs in the primary path, it needs to be handled by a set of management actions.

Call Set-up for Primary/Secondary VPs using Q.2931 if VP14 has failed, Node N4 detects failure. It sends an Alarm Indication Signal (AIS) to node N3:
Function Type: VP-AIS
Message Type: Restoration request
Failure Location: Incoming side (VP14) for VP43 failed. Designated to have 10 bytes of VP identifiers and 10 bytes of failure type.
Reserved Field: Unused After receiving the above AIS cell, Node N3 initiates the management actions to node 1 for developing the alternate VP by sending a VP-SH message to Node N2:
Message Type: Restoration Request
Required Bandwidth: Not used
Available Bandwidth: Specifies the VP identifier and unit bandwidth Node N2 compares the available bandwidth for VP23 from Node N3 and what is available for sending from N2 to N3 and selects the value that is smaller, and replaces the available bandwidth value corresponding to VP12 and sends the cell to Node N1. Node 1 accepts the bandwidth and sends return cell to N2, which then transfers to N3 and information transfer now is accommodated using the alternate path.

Figure 9:
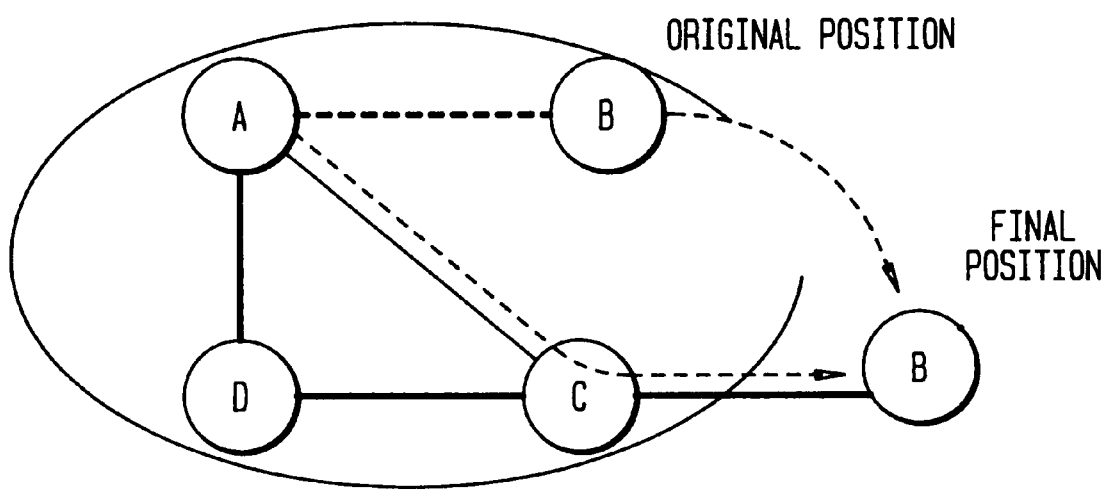
FIG. 9 is a schematic of a base station moving out of range in a wireless network.

Referring now to FIG. 9, under special tactical and mobile circumstances when the switch itself is mobile, the management actions need to ensure that the virtual path connections are maintained to the degree possible. Due to the mobility, wireless channels lose signal power and the network bandwidths need to be reconfigured to maintain good connectivity between the remaining switches.

The system comprises several base stations within each domain. These base stations are physically connected to two or more base stations under normal operational conditions. The logical connections based on virtual paths is always a mesh topology such that there exists one or more alternate path from every source to every destination within the same domain.

While handling the issue of a dynamic environment, three situations can occur. First, a base station B may move out of range of another base station A, in which case an alternate base station C must be found to dynamically route the calls from A to B.

This type of routing assumes connectivity between the moving node and at least one member of the original domain. Each base station within a domain will have all information about its own domain. Since there will be a ring architecture between the various network elements within a domain, there will always exist an alternate path for communications between any two members within the same domain. When one or more base stations moves out of the domain, the remaining members will reconfigure in topology to maintain a physical ring and a logical interconnection between all pairs of nodes.

The management and control planes for the Management Information Base (MIB) are divided into two categories. One aspect of it deals with the intelligent real time routing and call set up. The other aspect is the channel or physical connectivity management. Channel management and control is based on several criteria: Channel Utilization; Bridge Conditions; Power levels; Bit Error Rate; and Global Positioning System (GPS) information; Model priority levels; and Minimal reconfiguration sets.

These criteria are derived from a base layer communication functionality that connects the various MIBs that are physically resident as structured databases in the mobile base station. These data elements are communicated between domain members and in between domains themselves via API's that govern the physical connections using the Q.2931 protocol. The final decision to connect or disconnect particular links in a mobile environment is made by using the DSDR algorithm in a weighted manner.

Routing management and control in a mobile environment is based on intelligent decisions for a particular physical layer connectivity. As mentioned earlier, the physical connectivity is made to ensure that the certain conditions are met. The routing algorithm then draws upon routing tables that specify the physical layer connectivity and makes decisions for self healing the mobile network.

Returning back to stationary networks, the bandwidth optimization algorithm enables optimal allocation of bandwidths for virtual paths from each node to other nodes within a domain. This algorithm is continuously executed in each node for all VPs between itself and another node (switch pair), whenever there is a change in the traffic. Typically, the traffic changes due to new call arrivals, traffic changes due to addition of a new VCI channel on a VP, existing call termination, the lowering of traffic increases the available bandwidth, and/or rerouting changes the VP bandwidth.

Each switch pair has a VP assigned to a specific service class. $VP_{ij}$ (k) is the VP for traffic from source Node $N_i$ to destination Node $N_j$ for service class k to $N_j$.

In the four node model shown in FIG. 6, there are twelve switch pairs traffic: N1-N2, N1-N3, N1-N4, N2-N3, N2-N4, N3-N4, and N4-N3, N4-N2, N4-N1, N3-N2, N3-N1, N2-N1. Therefore, within a domain of 4 nodes, there are 12 switch pair VPs that use the available link capacities.

Whenever a call is originated at a node that is the source in the domain, the corresponding switch pair VP bandwidth allocated will increase between itself and its destination node.

A link is defined in terms of the capacity to deliver information between the source node and the destination node. Thus, a link between N1 and N2 has a capacity associated with the forward traffic from N1 to N2 and a reverse traffic from N2 to N1.

For optimal configuration algorithm, the link capacity is divided into three components: allocated capacity; available (Idle) capacity; and spare capacity. Allocated capacity is the sum of all VP bandwidths on the link. Available capacity is the unused capacity of the link. Spare capacity is a non-zero capacity that is not used for virtual path allocation, but is used for self-healing.

The result of the VP bandwidth reconfiguration (provides the new values for VP bandwidths) is used under the following conditions:

If the average idle capacity of all links<threshold and the new average is higher than the current, while maintaining QoS.

If self-healing is required for handling congestion and resource failures. The result of the VP bandwidth reconfiguration is not used: If the average idle capacity of all links>threshold2.

For self-healing algorithm, there are two objectives with respect to computation of call blocking probabilities. The first is computation of call blocking probabilities for each switch pair using recursion for optimization, that is, minimizing the maximum call blocking probability for a service class i VP bandwidth assignment for all switch pairs.

Call blocking probability, Pbi(swp) for a given switch pair is computed by using di and ai, where di is the resource units allocated to class I service units and ai is the offered load corresponding class i service. Therefore:

$$Pb_i(swp) = Q\{a_i, d_i\}$$

where Q {a, di} is a one dimensional recursive function based on "complete sharing policy" described by J. S. Kaufman, "Blocking in a shared resource environment," IEEE Transactions on Communications, Vol. COM-29, 1474–1481, 1981.

Assuming G(i) as the equilibrium probability that I resource units are allocated (or occupied), then the aggregate probabilities can be computed recursively by:

$$G(i) = \frac{1}{I}\Sigma a_k d_k G(I - d_k) \text{ for } i = 1, 2, \ldots V_p$$

where, Vp is the resource units used for a service class.

Then, the call blocking probability, Pbi(swp) for class i service is given by:

$$Pbi(swp) = \sum_{k=V_p-d_k+1}^{V_p} G(i) = \frac{1}{G}\sum_{j=1}^{d_k-1} G(V_p - j)$$

where, $$G = \sum_{i=1}^{V_p} G(i)$$

In the dynamic topology of the four node model, there are twelve Pbi(swp) for twelve switch pair traffic. Computation of twelve Pbi(swp) can be accomplished either using one of the nodes as a central node for all the domain or each source node i computes its own Pbi(swp). Since it is a background process, the Managed Objects (MOs.) and associated attributes can be set-up in the Management Information Base (MIB) to facilitate minimal management information transfer for the overall reconfiguration algorithm.

In this topology, each service class requires separately identified VPs. The organization of VP bandwidths for different classes depends on the implementation. An example of the VP organization is the allocation of VP for each class of service based on prorated usable capacity and spare capacity. Thus, the background algorithm computes the call blocking probabilities for each class of service separately.

There are twelve call blocking probabilities: Pbi(swp), where I=1,2, . . . , 12 in a four node model. More generally, there are n Pbi(swp). Recursive optimization requires iterative VP reconfiguration and computation of Pbi(swp). The objective in using recursion is to minimize the maximum call blocking probability of a service class. The maximum call blocking probability, Bmax(domain) is given by:

$$Bmax(domain)=Maximum \text{ of } \{Pbi(swp)\}$$

For inter-domain traffic, the use of this number by a domain for transport of multimedia traffic through adjacent domains will be facilitated by choosing the domain that has the minimum Bmax of all the adjacent transit domains.

For computing the Pbi(swp), multidimensional generalization Erlang model, that allows multiple classes of services each with a separate service time distribution and request resource size for each class, has been used. It is well known that this model produces a product form of state probability distribution. Also, the call blocking probabilities for different classes depends on the service time distributions only through their means. However, when the model is applied in the case where the "complete sharing policy (an arriving customer or call is admitted regardless of the class if there are adequate resources are available to meet the QoS)" is used, the probability distribution of the number of occupied resource units can be computed via a one dimensional recursion. This will enable efficient computation of the Pbi(swp).

The optimal reconfiguration algorithm is executed at each node for VP bandwidths for each switch pair traffic, where the node is the source node. This algorithm is executed as a background process, whenever there is a change in the traffic (typically when a new call arrives). The algorithm attempts to share the load by all links in the domain at the VP level. The output of this algorithm is an allocation of VPs on the physical paths and an associated bandwidth applicable for both self-healing mode and normal mode of operation.

In the self-healing mode, optimal configuration is required to ensure rerouting of VPs in order to ensure no disruption in service in the event of resource failure or congestion. In the normal mode, reconfiguration ensures increase of idle (unused) capacity of the links while maintaining minimum call blocking probability and providing high assurance of QoS.

The newly assigned VP bandwidths are optimized to support the lowest call blocking probability of all the required call blocking probabilities which is a derivative of the specified QoS. Therefore, it meets the desired QoS with high probability of assurance. There is always a chance (small probability) that when resource failures occur the optimal call blocking probability may not meet QoS requirements for some services. Even in this case, the service will not be disrupted, however, it will be at a lower QoS. Depending on the implementation, variability in QoS can be skillfully negotiated with service prioritization. This condition can further minimized as the spare capacity is increased.

EXAMPLE

Extensive real time simulation studies were conducted using the four node model described above. The node includes an ATM switch and an associated digital cross connect. The simulation parameters are:

ATM cross connects are located at equal intervals with 2.4 Gbit/s fiber links. The propagation delay between ATM cross connects is 0.5 ms. Two types of VP messages were used: fault management (type 1) and user service application (type 2). The processing time for messages is uniformly distributed between 30 ms and 50 ms for both message types.

ATM cross connect is designed to keep the overall processing load less than 0.5. The simulation results are in the paper 2. It indicates that VP bandwidth reconfiguration time is linearly proportional to the number of nodes, it traverses and does not constitute significant delay.

The present invention facilitates rapid development of the ATM WAN by providing value added enhancements to existing ATM Access Node technology as applied to an ATM WAN service environment. This technology facilitates the deployment of the ATM WAN by using a topology where the access nodes are directly connected using high speed physical transport pipes and using a topology where high speed physical transport pipes are switched using signaling protocols at the intermediate switches.

Having thus described the invention in detail, it is to be understood that the foregoing description is not intended to limit the spirit and scope thereof. What is desired to be protected by Letters Patent is set forth in the appended claims.

APPENDIX A

Initialization ();
{
Get_VP BW assignments for all VPs(assigned at the connection establishment using Q.2931)
Set_VPBW;
Get_Pbi(swp) for I=1,2, . . . , n;
Set_Bmax=max [Pbi(swp)];
Set_Bmin=0;
Set_Bav=[Bmax+Bmin]/2;
Set desired call blocking probability (Bd) for the service class;
};
DO {While Bmax is reducilbe}
{
reallocate_bandwidth()
Get_VP BW (new) and Set_VPBW(new);
Get_Pbi(swp) for I=1, 2, . . . , n; (using Kaufman's algorithm)
Get_Bmax(new)=max [Pbi(swp)];
If Bmax(new)<Bmax
Set_Bav=[Bmax+Bav]/2
check_optimum();
If Bmax is reducible
Repeat DO process;
Else
Set_VPBW(new);
Set_Bmax=Bmax(new);
If Bmax(new)>Bmax and Bd>=Bmax(new)
Use Set_VPBW and discard Set_VPBW(new);
End DO process.
};
reallocate_bandwidth()
{
If Pbi(swp)<Bav for a VP,
Set_VPBW=VPBW+X(X is an incremental units–integer);
If Pbi(swp)>Bav for a VP,
Set_VPBW=VPBW–X;
}
check_optimum()
{
If Bmax1>Bmax2<Bmax 3 or
Bmax1<Bmax 2>Bmax 3
    Then, Bmax is not reducible any more;
    (note: Bmax1, Bmax2, and Bmax 3 are computed Bmax for three successive iteration)
Else, Bmax is reducible;
}.
    Bmax and VP bandwidth values from the optimal reconfiguration algorithm are used in the Re-allocation strategy. Bmax is compared to the desired call blocking probability (Bd):
If Bmax>Bd
    The new cells are rejected
    The assignment of new VP bandwidths will not be made.
If Bmax>Bd The new calls are accepted and the assignment of new VP bandwidths will be made and the domain is reconfigured.

What is claimed is:

1. A method for providing non-disruptable service through a packet-based network comprising the steps of:

establishing a primary path and a secondary path between nodes in the network;

providing network management means for communicating between the nodes of the network and for detecting network resource failures, the network management means monitoring the available, used and spare bandwidth capacity of the network through management actions;

delivering an alarm indication management cell to specify the secondary path as a result of a network resource failure;

calculating the available bandwidth along the secondary path; and re-routing a transmission from a primary path to a secondary path without the need for re-establishing communication.

2. The method of claim 1 wherein the alarm indication management cell is delivered from an upstream node when congestion is detected by the upstream node.

3. The method of claim 1 wherein the alarm indication management cell issues from a down-stream node when a primary path has been cut.

4. The method of claim 1 wherein the step of providing network management further comprises the step of maximizing the bandwidth capacity of the network.

5. The method of claim 1 wherein further comprising the step of dividing the network into local domains and performing network managing and re-routing in the local domains of the network.

6. The method of claim 1 wherein spare capacity is used to re-route a transmission along a secondary path if available capacity does not exist.

7. The method of claim 6 wherein the bandwidth of all other virtual paths in the network is reconfigured using virtual bandwidth optimization.

8. The method of claim 1 further comprising the step of enhancing conventional nodes for use in providing network management.

9. The method of claim 8 further comprising the step of programming the nodes with a reconfiguration algorithm for optimizing network topology and reconfiguring virutal paths.

10. The method of claim 6 wherein the step of providing network management further comprises the step of calculating call blocking probablity for each switch pair and class of service in the network.

11. The method of claim 1 further comprising the step of re-routing a transmission from a secondary path back to a primary path upon resolution of the source of resource failure.

12. The method of claim 9 wherein the algorithm is continously executed whenever there is a change in traffic through the network.

13. The method of claim 12 wherein the algorithm is continously executed in each node for all virtual paths between that node and the node with which it is in contact.

14. The method of claim 10 wherein the step of computing call blocking comprises using recursion for optimization.

15. A method for providing non-disruptable service through a packet-based network comprising the steps of:

dividing the network into local domains;

establishing a primary path and a secondary path between nodes in the network;

providing network management means for communicating between the nodes of the network in the local domains, and for detecting network resource failures;

delivering an alarm indication management cell to specify the secondary path as a result of a network resource failure;

calculating the available bandwidth along the secondary path; and re-routing a transmission from a primary path to a secondary path in the local domains without the need for re-establishing communication.

16. The method of claim 15 wherein the alarm indication management cell is delivered from an up-stream node when congestion is detected by the upstream node.

17. The method of claim 15 wherein the alarm issues from a down-stream node when a primary path has been cut.

18. The method of claim 15 wherein the step of providing network management further comprises the step of monitoring the available, used and spare bandwidth capacity of the network through management actions.

19. The method of claim 18 wherein the step of providing network management further comprises the step of maximizing the bandwidth capacity of the network.

20. The method of claim 18 wherein spare capacity is used to re-route a transmission along a secondary path if available capacity does not exist.

21. The method of claim 20 wherein the bandwidth of all other virtual paths in the network is reconfigured using virtual bandwidth optimization.

22. The method of claim 21 further comprising the step of programming the nodes with a reconfiguration algorithm for optimizing network topology and reconfiguring virtual paths.

23. The method of claim 19 wherein the step of providing network management further comprises the step of calculating call blocking probability for each switch pair and class of service in the network.

24. The method of claim 15 further comprising the step of rerouting a transmission from a secondary path back to a primary path upon resolution of the source of resource failure.

25. The method of claim 22 wherein the algorithm is continuously executed whenever there is a change in traffic through the network.

26. The method of claim 25 wherein the algorithm is continuously executed in each node for all virtual paths between that node and the node with which it is in contact.

27. The method of claim 23 wherein the step of computing call blocking comprises using recursion for optimization.

28. A method for providing non-disruptable service through a packet-based network comprising the steps of:

establishing a primary path and a secondary path between nodes in the network;

enhancing conventional nodes for use in providing network management for communicating between the nodes of the network and for detecting network resource failures;

delivering an alarm indication management cell to specify the secondary path as a result of a network resource failure;

calculating the available bandwidth along the secondary path; and re-routing a transmission from a primary path to a secondary path without the need for re-establishing communication.

29. The method of claim 28 wherein the alarm indication management cell is delivered from an up-stream node when congestion is detected by the upstream node.

30. The method of claim 28 wherein the alarm indication management cell issues from a down-stream node when a primary path has been cut.

31. The method of claim 28 wherein the step of providing network management further comprises the step of monitoring the available, used and spare bandwidth capacity of the network through management actions.

32. The method of claim 31 wherein the step of providing network management further comprises the step of maximizing the bandwidth capacity of the network.

33. The method of claim 28 wherein further comprising the step of dividing the network into local domains and performing network managing and re-routing in the local domains of the network.

34. The method of claim 31 wherein spare capacity is used to re-route a transmission along a secondary path if available capacity does not exist.

35. The method of claim 34 wherein the bandwidth of all other virtual paths in the network is reconfigured using virtual bandwidth optimization.

36. The method of claim 28 further comprising the step of programming the nodes with a reconfiguration algorithm for optimizing network topology and reconfiguring virtual paths.

37. The method of claim 32 wherein the step of providing network management further comprises the step of calculating call blocking probability for each switch pair and class of service in the network.

38. The method of claim 28 further comprising the step of re-routing a transmission from a secondary path back to a primary path upon resolution of the source of resource failure.

39. The method of claim 36 wherein the algorithm is continuously executed whenever there is a change in traffic through the network.

40. The method of claim 39 wherein the algorithm is continuously executed in each node for all virtual paths between that node and the node with which it is in contact.

41. The method of claim 37 wherein the step of computing call blocking comprises using recursion for optimization.

42. A method for providing non-disruptable service through a packet-based network comprising the steps of:

establishing a primary path and a secondary path between nodes in the network;

providing network management means for communicating between the nodes of the network and for detecting congestion, the network management means monitoring the available, used and spare bandwidth capacity of the network through management actions;

delivering an alarm indication management cell to specify the secondary path as a result of a network resource failure;

calculating the available bandwidth along the secondary path; and re-routing a transmission from a primary path to a secondary path without the need for re-establishing communication.

43. The method of claim 42 wherein the alarm indication management cell is delivered from an up-stream node when congestion is detected by the upstream node.

44. The method of claim 42 wherein the alarm indication management cell issues from a down-stream node when a primary path has been cut.

45. The method of claim 42 wherein the step of providing network management further comprises the step of maximizing the bandwidth capacity of the network.

46. The method of claim 42 wherein further comprising the step of dividing the network into local domains and performing network managing and re-routing in the local domains of the network.

47. The method of claim 42 wherein spare capacity is used to re-route a transmission along a secondary path if available capacity does not exist.

48. The method of claim 47 wherein the bandwidth of all other virtual paths in the network is reconfigured using virtual bandwidth optimization.

49. The method of claim 42 further comprising the step of enhancing conventional nodes for use in providing network management.

50. The method of claim 49 further comprising the step of programming the nodes with a reconfiguration algorithm for optimizing network topology and reconfiguring virtual paths.

51. The method of claim 45 wherein the step of providing network management further comprises the step of calculating call blocking probability for each switch pair and class of service in the network.

52. The method of claim 42 further comprising the step of re-routing a transmission from a secondary path back to a primary path upon resolution of the source of resource failure.

53. The method of claim 50 wherein the algorithm is continuously executed whenever there is a change in traffic through the network.

54. The method of claim 53 wherein the algorithm is continuously executed in each node for all virtual paths between that node and the node with which it is in contact.

55. The method of claim 52 wherein the step of computing call blocking comprises using recursion for optimization.

* * * * *